July 22, 1952  F. L. ZYBACH  2,604,359
SELF-PROPELLED SPRINKLING IRRIGATING APPARATUS
Filed June 27, 1949  3 Sheets-Sheet 1
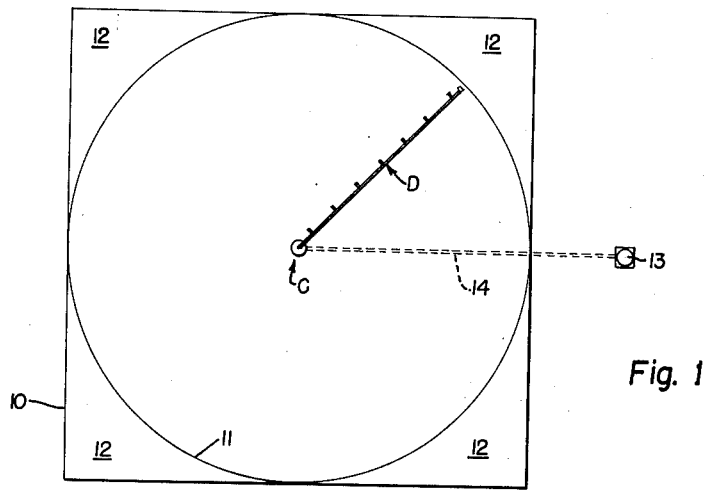
Fig. 1
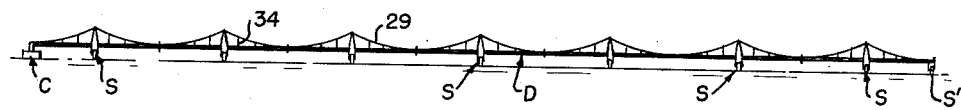
Fig. 2
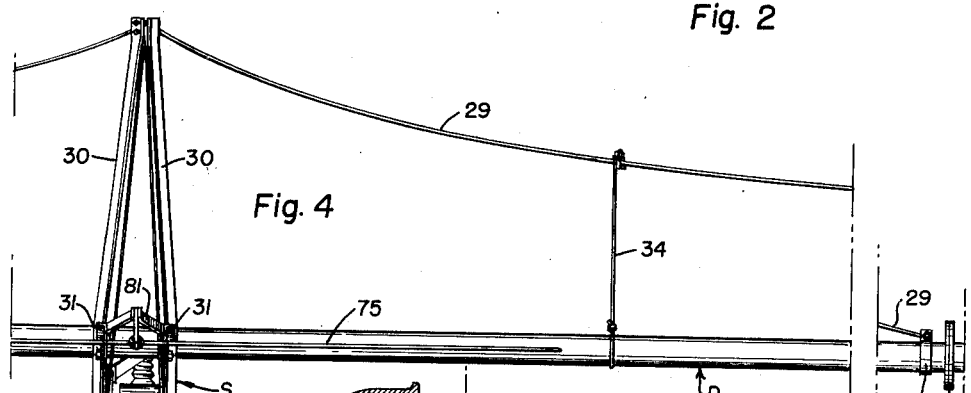
Fig. 4
Fig. 3
INVENTOR.
FRANK L. ZYBACH
BY
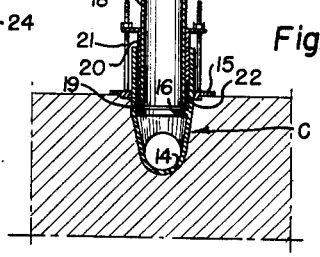
ATTORNEYS July 22, 1952
F. L. ZYBACH
2,604,359
SELF-PROPELLED SPRINKLING IRRIGATING APPARATUS
Filed June 27, 1949
3 Sheets-Sheet 3
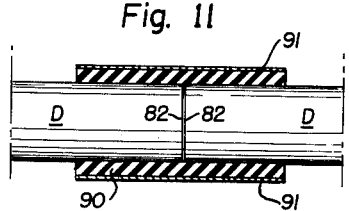
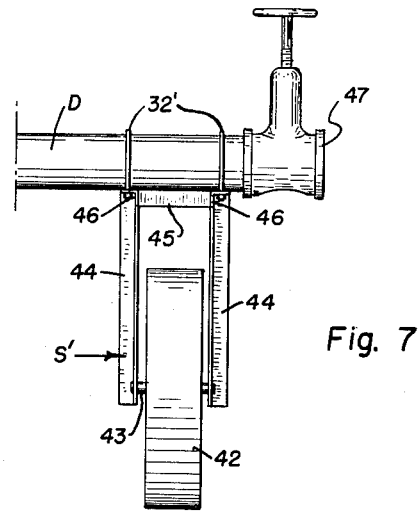
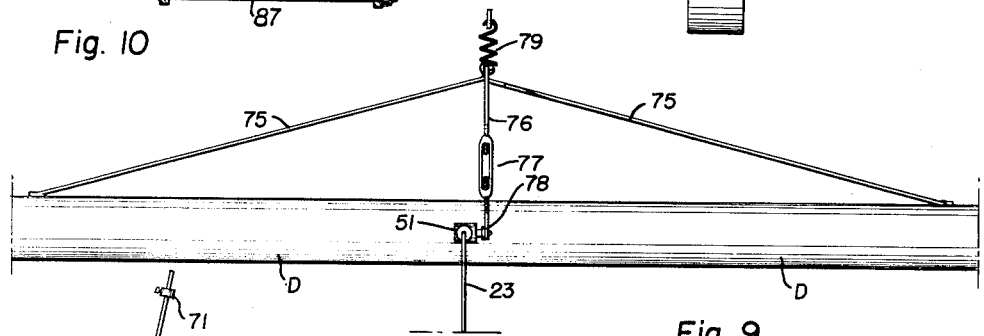
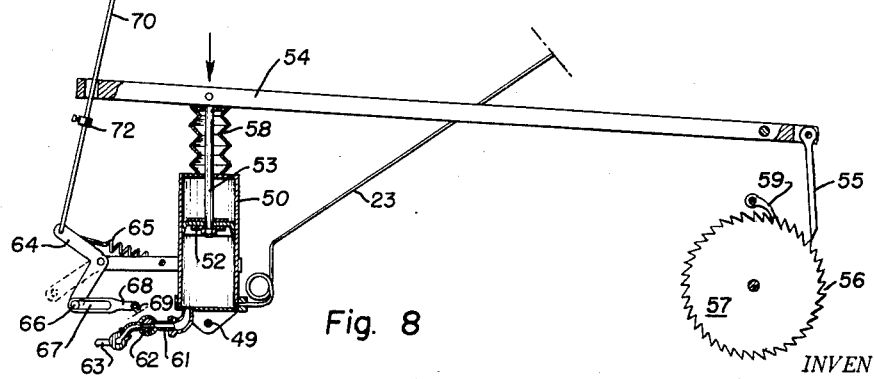
INVENTOR.
FRANK L. ZYBACH
BY
Laugher & VanValkenburgh
ATTORNEYS Patented July 22, 1952

2,604,359

UNITED STATES PATENT OFFICE 2,604,359

SELF-PROPELLED SPRINKLING IRRIGATING APPARATUS

Frank L. Zybach, Strasburg, Colo.

Application June 27, 1949, Serial No. 101,528

13 Claims. (Cl. 299—54)

This invention relates to sprinkling and irrigation apparatus, and more particularly to self-propelled apparatus for sprinkling or irrigating relatively large sections of land or the like.

In sections of the country where the natural rainfall is not sufficient to cause a maximum growth of crops, it is often desirable and sometimes absolutely necessary to provide additional water. This water may be taken from a river or lake, perhaps some distance away from the field in which the crops to be irrigated are being grown, and carried through a ditch or the like to the field. Or, the water may be obtained from an artesian well or other underground source, the well sometimes developing sufficient pressure to make pumps unnecessary, although water from an underground table usually must be pumped. In the normal manner of irrigation with water from a ditch, the water is directed along successive lateral ditches, such as between rows, and in effect floods the area being irrigated. This method is usually satisfactory in the case of crops having considerable distances between the rows, such as sugar beets, but in the case of wheat and other more closely spaced crops, the irrigating ditches may occupy an undue portion of the land. Furthermore, the contour of the land is often such that satisfactory irrigation by ditches is quite difficult. This method also tends to be unduly wasteful of water, such as from run-off and evaporation from pools.

Water supplied from a well can be distributed to a desired tract of land by irrigation ditches, but more effective and adequate watering can be accomplished by sprinkling the water onto the land. Sprinkling tends to produce more of a soaking effect, such as in the case of natural rainfall, and greater benefits are usually obtained by sprinkling with smaller amounts of water for a longer period of time. Stationary sprinkling systems have proven practical for intensely cultivated land, more particularly when flowers, vegetables and similar horticultural varieties are being grown, but such stationary systems often interfere seriously with cultivation, and also are very expensive to install in relatively large tracts of land, such as a quarter section or the like.

Also, a supply pipe has been laid across a field, and individual sprinkling pipes connected thereto at various points, the sprinkling pipes being set up for successive areas. However, the position of the pipes must be changed for each new area to be sprinkled, the workmen must walk through the muddy ground to reach the pipes, substantially the full time of two or more workmen is required, and the task becomes more difficult as the crop grows higher.

It has been proposed to take water from an artesian well, or water pumped from a well to the center of a field to a central supply pipe and connect thereto a relatively long distributing pipe rotated about the central pipe as an axis, wheeled supports being placed at intervals along the distributing pipe. Previous driving or rotating mechanisms proposed have included sets of cables wound around drums, for pulling the pipe around various portions of the field, or internal combustion engines or electric motors at each of the supports. A rather complicated and cumbersome overhead trolley suspension system extending around the periphery of the field has also been proposed. All of these previous proposals have suffered from numerous disadvantages, such as the need for constant attention or abnormally high initial cost. In addition, since a distributing pipe pivoted at the center of a quarter section of land must be about 1320 feet long to reach the edge of the field at each side, previous distributing pipes, mounted on wheeled supports, have been subject to a further and serious disadvantage—lack of control of the relative position of the supports, as the result of a tendency for a support to run ahead or lag behind other supports, thus causing misalignment, strains in the pipe and undue strain or perhaps breakage of the pipe or associated parts.

Since water from an irrigation ditch, which has flowed for any substantial distance therealong, usually carries a large amount of silt or debris, the apparatus of the present invention is particularly applicable to the distribution of water obtained from a well or other relatively clarified source, although not limited thereto.

Among the objects of the present invention are to provide novel irrigation or sprinkling apparatus, particularly useful for relatively large tracts of land; to provide such apparatus which is an improvement upon those previously proposed, wherein a distributing pipe is moved around a centrally located supply pipe; to provide such apparatus wherein the distributing pipe is supported at intervals and wherein the problem of misalignment of various portions of the pipe is overcome; to provide such apparatus, including a distributing pipe having supports, wherein the tendency for one or more of the supports to lag behind or run ahead of other supports is overcome; to provide such apparatus wherein the drive arrangement for the supports is considerably simplified; to provide such apparatus wherein the drive for the supports is readily controlled; to provide such apparatus which may be left in operation for several days or weeks, if desired, and will thereby tend to provide a soaking effect; to provide such apparatus which can be operated with a relatively low water pressure; to provide such apparatus which may be made relatively light in weight, and which may be shifted from one tract of land to another; to provide such apparatus which includes a distributing pipe which may be readily lengthened or shortened as desired; and to provide such apparatus which entails a minimum of operational and constructional difficulties.

In general, in sprinkling and irrigation apparatus for a relatively large section or tract of land, constructed in accordance with the present invention, a distributing pipe is pivotally connected to a central supply pipe and is movable around the central pipe as an axis, while a plurality of supports are disposed at spaced positions along the distributing pipe and a plurality of discharge nozzles are also spaced along the distributing pipe for spraying water on the land as the distributing pipe moves around. The improvements of the present invention include water actuated drive means at the supports, which drive means are supplied with water from the distributing pipe and which preferably discharge exhaust water rearwardly and to one or each side. Such drive means may include a cylinder and piston to which water under pressure is supplied for movement in one direction, an exhaust line leading from the cylinder preferably being substantially larger than the inlet line, so that only one direction control valve, i. e. an exhaust valve, is necessary. Thus, when the exhaust valve is closed the piston will be pushed upon and when the exhaust valve is open the piston will move down, the inlet line supplying water continuously but the water running out of the discharge line faster than it can come in when the exhaust valve is open.

Another improvement of the present invention lies in a control device at each intermediate support, for automatically controlling the drive means in accordance with springing of the distributing pipe, due to unequal movement at the supports, and thereby maintaining the pipe in alignment. Such a control device may take the form of a tension cable attached to the pipe at a point spaced to each side of the support, and adapted to determine the position of a regulating valve which controls the amount of water supplied to the cylinder inlet line. The speed of one support, such as the support at the outer end of the distributing pipe, is adjusted independently or set by hand, so that this support will act as a "master support" and regulate the speed of the entire pipe. Additional improvements include the use of flexible joints at the supports when the distributing pipe itself is relatively inflexible, and an outer section which is provided with a valve, so that the corner of a rectangular area may be irrigated by flooding, by a separate sprinkling pipe, or in any other desired manner.

Additional features of the present invention will be apparent from the more detailed description which follows, taken in connection with the accompanying drawings, in which Fig. 1 is a diagram, on a considerably reduced scale, of a field to be sprinkled or irrigated and in which is installed apparatus constructed in accordance with this invention;

Fig. 2 is a front elevation, on a reduced scale, of a distributing pipe and the supports therefor;

Fig. 3 is a fragmentary vertical section taken at the central supply pipe;

Fig. 4 is a fragmentary elevation on a larger scale, partly broken away, of a portion of the distributing pipe and one support therefor;

Fig. 7 is a front elevation of an auxiliary support at the outer end of the distributing pipe;

Fig. 8 is a side elevation, partly in section, limited to the drive means for the support of Figs. 4–6;

Fig. 9 is a top plan view, limited to a portion of the distributing pipe and the tension cable, and certain associated parts, for controlling the speed of the drive means at the support;

Fig. 10 is a fragmentary top plan view, partly in section, taken at the support, illustrating particularly an alternative construction in which a flexible joint is utilized; and Fig. 11 is a fragmentary longitudinal section showing an alternative joint.

Figure 5:
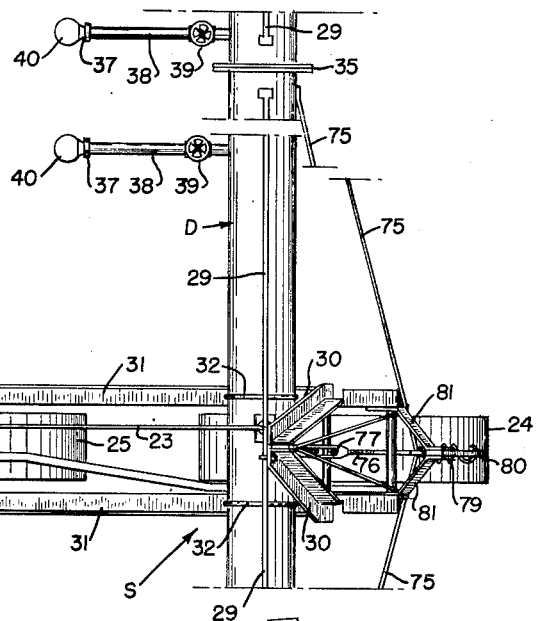
Fig. 5 is a top plan view of the support and a portion of the distributing pipe of Fig. 4.

As in Figs. 1–3, a relatively long distributing pipe D may be mounted on a plurality of supports S, and connected at the center of the field 10 to the central pipe C. When rotated around the central pipe C, the outer end of the distributing pipe D will traverse a circular path, such as around circle 11, to spray water on all of the land enclosed within circle 11. When the field 10 is square, as shown, the corners 12 are outside circle 11 and will be unwatered by rotation of pipe D, but the corners are very readily watered in accordance with special provisions hereinafter described. The central pipe C may be supplied from a well or other source of relatively clear water, i. e. free of floating debris or undue amounts of silt, sand, gravel or the like. If possible, the well is drilled at the center of the field 10, and if an artesian well and the water pressure is sufficient, no pump will be necessary. If the pressure is not sufficient, then a pump must be used, which may be a conventional deep well pump or the like, such as installed in a pit dug behind or slightly to one side of the central pipe C. The principal requirements of the pump motor location is that it does not extend far enough above ground to interfere with the rotating movement of distributing pipe D, which may be disposed at a convenient height, such as from 2 to 6 feet above ground level, thereby passing over the crop when grown. When the pump motor is installed within the confines of the field, electric wires thereto may be buried in a ditch, plowed for the purpose, and the ground then turned thereover.

When the well, such as the well 13 in Fig. 1, is located outside the field, a pipe 14 leads from the well to the central pipe C and is preferably buried sufficiently deep so as not to be damaged or dislodged by plowing, cultivating or the like. As indicated above, if the water pressure of well 13 is insufficient, a pump is preferably installed, which will usually be located at the well.

The connection between central pipe C and the rotating distributing pipe D, may be a suitable sealing connection, such as of the type illustrated in Fig. 3, in which the central pipe C is provided with an exterior, packing attachment flange 15 and an interior safety flange 16, and the distributing pipe D terminates at its inner end in an elbow 17 from which depends a vertical pipe 18, in turn having an outwardly extending packing flange 19 at the lower end thereof. A packing gland 20, which may be attached by a series of bolts 21 to the exterior flange 15 of central pipe C, is adapted to clamp packing 22 against packing flange 19, so that as vertical pipe 18 and distributing pipe D rotate, there will be no leakage of water. As will be evident, many other types of sealing joints may be utilized.

Figure 6:
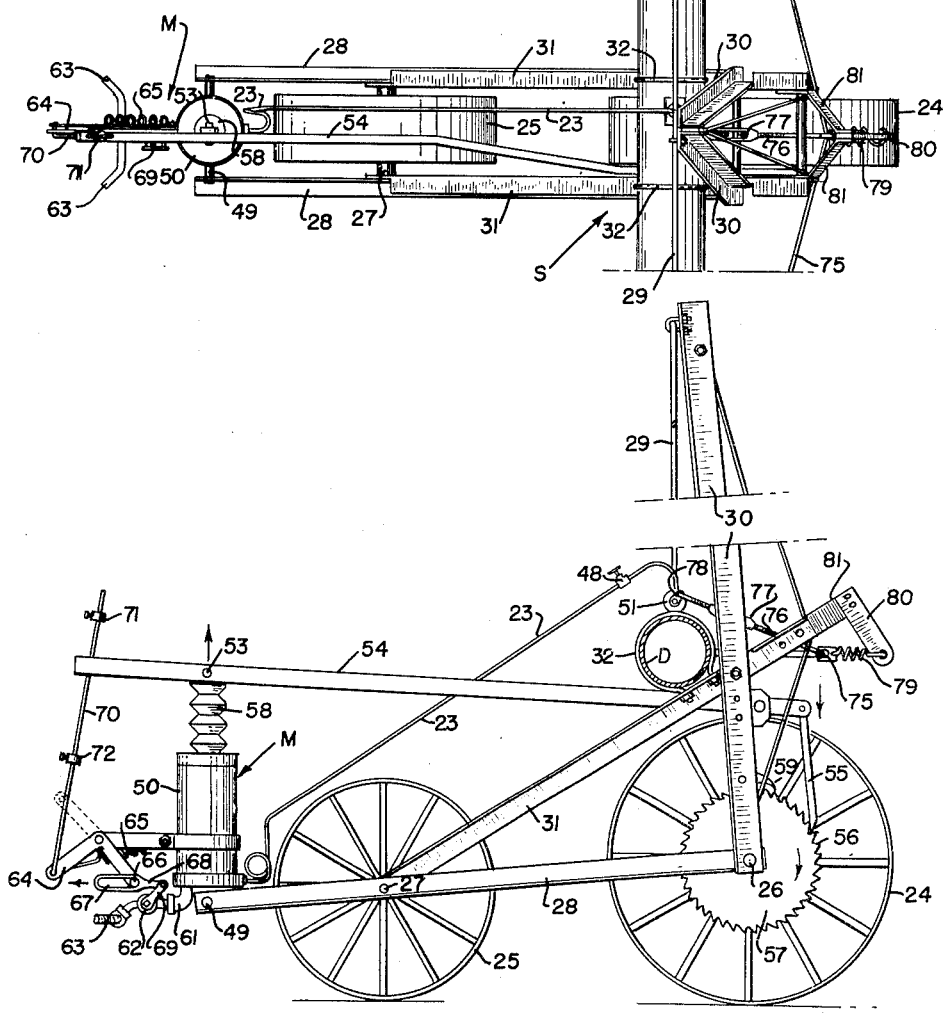
Fig. 6 is a side elevation of the support of Figs. 4 and 5.

In accordance with the present invention, each of the supports S, except the last support S' at the outer end of the distributing pipe D, is driven by a water actuated drive means M of Figs. 5 and 6, the water therefor being supplied from distributing pipe D through inlet line 23. As in Figs. 4–6, each of the supports S may include a front driving wheel 24 and a rear supporting wheel 25. The axles 26 and 27 for wheels 24 and 25, respectively, may extend between beams 28, on the rear ends of which the drive means M may be mounted. The wheels 24 and 25 are preferably sufficiently wide to support the weight of a section of pipe D, such as 200 feet long, but preferably are made as narrow as possible to reduce the area of growing crop which may be prevented from growing by the wheels. A tower structure for a cable 29 which supports pipe D to each side of support S, may consist of a pair of upright angles 30 bolted together at the top and extending down to axles 26 for wheel 24 and steadied by a pair of braces 31 which extend forwardly from the axle 27 of rear wheel 25 and also forwardly of upright 29, for a purpose hereinafter described. The pipe D may be attached to the uprights 30, but preferably to the braces 31 since the latter are more nearly horizontal, and also the weight of the pipe may thus be disposed rearwardly of the axle of the front wheel 24. Pipe clamps 32, or any other suitable attaching means may be utilized for the purpose. The supports S may be disposed a convenient distance apart, such as approximately 200 feet, while cable 29 is preferably mounted at its center atop the tower formed by uprights 30 and extends nearly to the midpoint between two supports S, each outer end of the cable being attached to the pipe D, as by a clamp 33 of Fig. 4, or by being welded to the pipe D, as in Fig. 5. In addition, a plurality of vertical cables 34 extend from the cable 29 down to the pipe D at suitable points, such as spaced equi-distantly between the support S and the ends of cable 29. As will be evident, cable 29 is, in effect, a cantilever cable, and the section of pipe supported from each support S is thus balanced. A detachable joint is preferably provided at the junction between each of the sections of pipe D, such as by the flanges 35 of Figs. 4 and 5, or by a conventional union.

A plurality of sprinkling heads 37 are disposed at suitable spaced distances along the pipe D, being mounted on rearwardly extending pipes 38, which may be provided with shutoff valves 39. The sprinkling heads 37 may be of any suitable type, such as provided with a nozzle for discharging a jet of water against a flat blade 40, which spreads the stream and causes a greater area behind the pipe to be watered by each head. The sprinkling heads 37 are preferably spaced apart in accordance with the width of the stream of water discharged from each head, with a slight overlap to insure complete coverage, the nozzles preferably varying in the amount of water discharged, in accordance with the distance from the center. That is, nozzles farther from the center may discharge a greater amount of water, or be spaced closer together, because of the greater territory to be covered at a longer radius.

The auxiliary support S', at the outer end of the pipe D, as in Figs. 2 and 7, is not required to support as much weight as the supports S, and therefore may comprise a single wheel 42 having an axle 43, which extends between a pair of uprights 44 connected at the top by a spacer 45 and carrying a pair of transversely extending angles 46, to which the pipe D may be attached by clamps 32'. The extreme end of the pipe is also preferably provided with a shutoff valve 47, which may be utilized in irrigating the corners 12 of the field, but which is closed during rotation of the pipe D.

The pipe D is preferably of a sufficient diameter, such as six inches, to provide a reservoir of water which therefore may be at a low pressure, such as 25 pounds per square inch, so that the pressure at each of the heads 37 will be substantially the same. The heads 37 preferably do not discharge large volumes of water, but merely enough to approximate a light to medium rainfall, so that as the pipe D is rotated slowly around the field, the water will have an opportunity to soak into the ground without forming a great number of pools, from which an undue amount of water may tend to evaporate. Thus, to adequately water the field it may be necessary for the pipe D to consume a number of days, to traverse the field completely. In fact, it is contemplated that the apparatus can be set in motion and run continuously for several days or weeks, so that by the end of that time the field will be adequately watered. The apparatus is particularly adapted for use with wells having a relatively small rate of flow, such as on the order of 200 gallons per minute. When the end of pipe D reaches any of the corners 12, or at any other desired time, all of the shutoff valves 39 for the sprinkling heads, and also a shutoff valve 48 for each of the drive means M (see Fig. 6) may be turned off, and a separate sprinkling pipe or hoses may be connected to the end valve 47, which may then be opened to permit the corner 12 to be watered. Or, if the slope and configuration of the land is amenable thereto, the end valve 47 may merely be opened and the corner irrigated. As soon as one corner has been irrigated or sprinkled, the valves 48 for the drive means may be opened and the pipe permitted to continue sprinkling while moving around to the next corner 12. If desired, the corners need not be irrigated, or a special sprinkling attachment may be used which will cover a majority of the corner, but perhaps not all. It will be evident, of course, that the corners 12 must be sprinkled or irrigated by additional operations but the time and difficulty involved is much less than would be required to sprinkle or irrigate the entire field, and a considerable saving in time and effort is made, particularly since the device may be left operating automatically for many hours or days and nights at a time and without any attention on the part of the operator.

Each of the drive means M, as in Figs. 5, 6 and 8, may comprise a single cylinder 50, pivotally mounted by a transverse pin 49 on the rear end of braces 31, and supplied with water from the pipe D through line 23, which may be a relatively small tube. In addition to shutoff valve 48, each line 23 also is provided with a regulating valve 51, which also is preferably adjustable to within reasonable limits of the flow which will produce approximately the desired speed of traverse, such as one complete revolution around the field in a time which corresponds to the amount of water to be sprinkled onto the field. Such time may vary between a few days and several weeks. The cross-sectional area of cylinder 50 is relatively large compared with that of tube 23, so that water supplied through tube 23 to the interior of cylinder 50 will cause a piston 52 to rise slowly. As the piston 52 rises, a piston rod 53, which is pivotally attached at its upper end to a crank 54, in turn pivotally mounted adjacent its front end on one of the uprights 30, will move the rear end of the crank upwardly, such as in the direction of the arrow of Fig. 6, to rotate the front wheel 24 at the same slow rate, through a ratchet 55 pivoted to the front end of crank 54 and the lower end of which is adapted to engage ratchet teeth 56 of a wheel 57, of smaller diameter than drive wheel 24 but mounted thereon at one side.

A bellows seal 58 may be provided at the upper end of cylinder 50 to prevent dust or the like from entering the cylinder and damaging the cylinder walls or piston 52. The bellows 58 expands and contracts during the movement of the piston, but preferably is not subjected to any water pressure. During upward movement of crank 54, the ratchet teeth 56 will slide past a pawl 59, but on the return stroke of crank 54, as in Fig. 8, the pawl 59 will prevent reverse rotation of the wheel 57 so that ratchet 55 can move upwardly to engage another tooth on the next power stroke of crank 54.

The cylinder 50 is provided with a relatively large outlet pipe 61 in which is installed a shut-off valve 62 and which terminates in a pair of discharge spouts 63. When the piston in cylinder 50 is being moved upwardly, as in Fig. 6, the valve 62 is closed, but when the piston reaches the top of the stroke, the valve 62 is opened and the water flows from the cylinder at a faster rate than it can enter through the tube 23, thus permitting the piston to move downwardly in the cylinder. The discharge spouts 63 are preferably inclined laterally and rearwardly, so that the water discharged from the cylinder will flow to each side of the path over which the wheels 24 and 25 run, thus not only preventing the path from becoming muddy, but also discharging the water into the crop area to each side of the path. The spouts 63 preferably do not extend laterally any further than the braces 31, to provide as little interference as possible with the growing crop.

Each valve 62 may be opened and closed automatically in accordance with the positions reached by piston 52 and crank 54, such as by a right angle toggle lever 64 which is snapped to up and down positions by a spring 65, as soon as it is moved slightly past center in either direction. One leg of lever 64 is provided with a pin 66, which engages a lost-motion slot 67 in a link 68, in turn connected to handle 69 of valve 62, while the other leg of toggle lever 64 is provided with a rod 70 having upper and lower adjustable stops 71 and 72, respectively. Thus, when the crank 54 is moving upwardly as in Fig. 6, as soon as it encounters upper stop 71 on rod 70 it will lift the rod and move toggle lever 64 slightly past center, whereupon spring 65 will snap the toggle lever 64 to the dotted position of Fig. 6, thereby opening the valve 62. At this time, the water will begin to drain from cylinder 50, and the piston 52 and crank 54 will begin to move downwardly, the parts during downward movement being in the relative positions shown in Fig. 8. As soon as the crank 54, which may be weighted if desired, engages the lower stop 72 on rod 70, further downward movement will shift toggle lever 64 slightly past center, whereupon spring 65 will snap the lever to the dotted position of Fig. 8 and valve 62 will be closed. As will be evident, when valve 62 is closed, the water supplied under pressure through tube 23 will move the piston 52 upwardly, at a rate corresponding to the flow of water to the cylinder. This procedure is repeated over and over again automatically, and causes each support S to advance relatively slowly around the field.

In further accordance with this invention, the hydraulic drive means M may be automatically controlled, to maintain each support S substantially in alignment with the other supports, so that one section of the pipe D will not run too far ahead or behind the other section. As indicated previously, the outer end support S may be utilized as a control support, and the speed thereof may be regulated through valve 43. Each of the other supports S is provided with an automatic tension control device, which includes a tension cable 75, which need not be a heavy cable, but need be only wire, and each end of which is attached to the pipe D at an equal distance to each side of the support S, as in Figs. 5 and 9. The tension cable 75 may pass through an eye or otherwise be operatively connected with a control rod 76, preferably provided with a length adjustment, such as a turnbuckle 77, and connected to control handle 78 of regulating valve 51, so that valve 51 will be opened or closed by slight increments in accordance with the movement of rod 76, in turn produced by tension or slack in cable 75. A coil spring 79, which extends from rod 76 adjacent cable 75 to an arm 80, which may be mounted on a V-bracket 81, in turn mounted on the front ends of braces 31, normally holds the rod 76 out against the tension of cable 75. Tension or slack in cable 75 is produced by springing or flexing of pipe D, due to one of the supports S running ahead or behind one of the adjacent supports. Thus, if any one support S tends to run ahead of the adjacent supports, then the pipe D will tend to spring back from such support, thus producing additional tension on cable 75 and thereby moving rod 76 rearwardly against the tension of spring 79, to move regulating valve 51 toward closed position. This reduces the flow of water through tube 23 to the cylinder 50, and causes the support S involved to move at a slower rate, which will continue until the adjacent supports S have caught up with it. Also, if any one support S lags behind the adjacent supports, then the pipe D will tend to spring or flex in the opposite direction, thereby producing slack in cable 75, which will be taken up by spring 79, thereby moving rod 76 and valve 51 toward open position. This will increase the flow of water through tube 23 to the cylinder 50 involved, thereby increasing the speed of movement of the support which increased speed will continue until the support has caught up with the adjacent supports. By utilizing one of the supports, such as the last support to the outside, as a "master support," the other supports, through the control devices, will automatically maintain the pipe in alignment and the speed of movement thereof will be automatically maintained in correspondence with the speed of movement of the master support.

Since water from a well usually has a relatively uniform temperature, the flow thereof through pipe D will maintain the pipe at a substantially uniform temperature, but the cable 75 is preferably made of a material such as Invar, which has a relatively negligible coefficient of expansion. Thus, if the outside temperature varies considerably, or the rays of the sun tend to heat up the cable 75, the control device will not be seriously affected. In order to achieve as light weight as possible, the pipe D may be made of aluminum, or an alloy light in weight. However, for very large fields, it may be necessary to use relatively large size pipe, which to withstand the stress of being supported at only approximately 200 feet intervals, may require relatively heavy walls and the pipe may be insufficiently flexible to respond accurately to the condition in which one of the supports S tends to run ahead of or behind adjacent supports. In such a case, it may usually prove desirable to provide a flexible joint or coupling in the pipe D at each of the supports S, two suitable types of which are shown in Figs. 10 and 11. In Fig. 10, the abutting ends 82 of sections of pipe D extend into a cylindrical sleeve 83 having an outwardly and diagonally extending flange 84 at each end, packing 85 being compressed against the pipes between the flanges 84 and rings 86, which are tightened by draw bolts 87. This type of coupling provides a flexible joint at the support, so that if the support tends to run ahead or behind adjacent supports, a slight bend in the pipe will tend to occur at the coupling, thereby permitting tension cable 75 to control the speed of the support in a manner previously described. In Fig. 11, a sleeve 90 is formed of rubber, either natural or synthetic, or other flexible material, and is reinforced by a metal sleeve 91, to connect the two pipe ends 82, again providing a flexible joint which permits a bend in a relatively heavy or inflexible pipe.

The apparatus of this invention may also be moved from one field to another, merely by disconnecting the joints between sections, such as the flanges 35 of Fig. 4, and the section with each support S moved to another field. If the size of the next field is less than that of the previous field, one or more of the intermediate sections may be omitted, the outer support S again being utilized as a master or speed control support, and the valve 47 being utilized in sprinkling or irrigating corners. At the central pipe C, the sealing joint may be left intact and the pipe D disconnected at elbow 17, if desired, thus requiring a sealing joint at each field and preferably a readily disconnected joint, as by flanges or a union at the elbow. When the field contains a quarter section, or 160 acres of land, the distributing pipe D will be 1320 feet long, thus involving seven sections slightly less than 200 feet long. For moving such sections from field to field, a special trailer may be utilized, to be drawn by a tractor, and onto which a support S may be run and transported lengthwise. For larger fields, such as several square miles in area, a series of central supply pipes, connected to individual wells, or several central supply pipes connected to the same well, may be utilized.

It may happen that the land to be watered is relatively hilly, in which event the supports may tend to run much faster downhill, thus reducing the sprinkling time for the area involved. In such event, it may be desirable to substitute, for drive wheels 24, walking shoes, such as three in number, which are actuated by crank 54, the center shoe being moved intermittently by the crank and the other shoes sustaining the weight while the center shoe is being moved from one position to the next. Such shoes may be pivotally or slidably mounted, and actuated by selective links, through the crank 54. Or, if desired, brakes may be associated with the supports, to limit the speed thereof.

From the foregoing, it will be apparent that the sprinkling and irrigation apparatus of this invention fulfills to a marked degree the requirements and objects hereinbefore set forth. The provision of a water actuated drive means at each support avoids any necessity for carrying electrical wires or the like along the distributing pipe, or of installing a relatively heavy internal combustion engine or motor at each support. The use of the same water which is being sprinkled onto the field, to drive the distributing pipe provides a convenient and constant source of power, and none of this water is wasted since the discharge from the drive means is preferably to each side thereby causing the discharged water to be supplied to the crop. The provision of a hydraulic cylinder and piston which requires pressure for movement in only one direction simplifies considerably the construction of the drive means, and also reduces the weight carried by each support. By supplying inlet water continuously and utilizing a relatively large discharge line, the control mechanism for the drive means is reduced to a minimum of parts.

The automatic control of the speed of each support, in accordance with the springing or flexure of the distributing pipe, is a feature of considerable importance. By controlling the speed of each support through a simple tension cable, the distributing pipe itself can be made lighter in weight, since the stresses which would otherwise be imposed upon it by some of the supports tending to run far ahead or behind other supports are eliminated or highly minimized. Even with a relatively inflexible pipe, a similar control can be used, merely by installing a flexible coupling or joint at the support.

There are, of course, other features of construction of the embodiments illustrated and described which are of value, but, in general, considerable variation in the actual construction can be made. Also, it will be understood that other embodiments of this invention may exist, and various other changes made, all without departing from the spirit and scope of this invention.

What is claimed is:

1. In sprinkling and irrigation apparatus for a relatively large section of land or the like, which includes a central water supply pipe, a distributing pipe pivotally connected to said central supply pipe and movable around said central pipe as an axis, a plurality of supports disposed at spaced positions along said distributing pipe, and a plurality of discharge nozzles spaced along said distributing pipe for spraying water onto the land as said distributing pipe moves around, the improvement which comprises drive means at each support; and a control device at each intermediate support for controlling said drive means in accordance with the springing or bending of said distributing pipe due to unequal movement at said supports, said control device including a tension cable attached to said distributing pipe at substantially equal distances to each side of said intermediate support, and a spring at said intermediate support holding said tension cable away from said distributing pipe.

2. In sprinkling and irrigation apparatus, the improvement defined in claim 1, wherein said drive means is water actuated, and said apparatus at each said intermediate support includes a regulating valve for controlling the water supplied to said drive means, and a lever connected between said tension cable and said valve.

3. In a sprinkling and irrigation system for a relatively large section of land or the like normally including a central water supply pipe, a distributing pipe pivotally connected to said central supply pipe and movable around said central pipe as an axis, a plurality of supports disposed at spaced positions along said distributing pipe, and a plurality of discharge nozzles spaced along said distributing pipe for spraying water onto the land as said distributing pipe moves around, the improvement which comprises a water actuated piston and cylinder on each said support, for driving said support; a relatively small inlet and supply line from said distributing pipe to one end of said cylinder; a relatively large water outlet line leading from the same end of said cylinder; and a valve in said outlet line, said valve being closed to cause said piston to move in one direction and open to permit water to flow out of said cylinder at a faster rate than supplied through said inlet line and thereby permit said piston to move in the opposite direction.

4. In sprinkling and irrigation apparatus, the improvement defined in claim 3, including a crank for driving said support and actuated by said piston; a toggle lever for moving said exhaust valve to open and closed position; a spring for holding said toggle lever in different positions; and a control rod having adjustable stops adapted to be engaged by said crank for moving said toggle lever to said different positions.

5. In sprinkling and irrigation apparatus for a relatively large section of land or the like, which includes a central water supply pipe, a distributing pipe pivotally connected to said central supply pipe and movable around said central pipe as an axis, a plurality of supports disposed at spaced positions along said distributing pipe, and a plurality of discharge nozzles spaced along said distributing pipe for spraying water onto the land as said distributing pipe moves around, the improvement which comprises a plurality of supports which include a drive wheel and an idler wheel disposed laterally with respect to said distributing pipe; a framework providing a tower extending above said drive wheel and connected with said rear wheel; a longitudinal cable mounted centrally on said tower and extending to either side thereof and attached to said distributing pipe near the midpoint between supports, said distributing pipe having a detachable joint at each said midpoint; spaced vertical cables extending from said longitudinal cable to said distributing pipe; water actuated means supplied from said distributing pipe for driving each said support; and a wheeled auxiliary support at the outer end of said distributing pipe.

6. In sprinkling and irrigation apparatus, the improvement defined in claim 5, including a water supply line leading from said distributing pipe to said drive means at each support; a regulating valve in said line; a lateral tension cable connected to said distributing pipe at equal distances from each said support except one; a spring tending to hold said cable away from said pipe; and an adjustable lever connecting each said tension cable and the corresponding regulating valve, for moving said regulating valve toward upon and closed positions in accordance with the springing or bending of said pipe as one support tends to lag behind or travel ahead of adjacent supports, thereby to regulate the speed of individual supports to maintain said distributing pipe in alignment, one of said driven supports being adapted to be regulated in speed by setting said regulating valve and the remaining driven supports will tend to maintain alignment therewith.

7. In sprinkling and irrigation apparatus, the improvement defined in claim 6, including a water actuated piston and cylinder on each said support, for driving said support; a relatively small inlet and supply line from said distributing pipe to one end of said cylinder; a relatively large water outlet pipe leading from the same end of said cylinder; a valve in said outlet line, said valve being closed to cause said piston to move in one direction and opened to permit water to flow out of said cylinder at a faster rate than supplied through said inlet line and thereby cause said piston to move in the opposite direction; a crank for driving said support and actuated by said piston; a toggle lever for moving said exhaust valve to open and closed positions; a spring for holding said toggle lever in different positions; and a control rod having adjustable stops adapted to be engaged by said crank for moving said toggle lever to said different positions.

8. In sprinkling and irrigation apparatus for a relatively large section of land or the like, which includes a central water supply pipe, a distributing pipe pivotally connected to said central supply pipe and movable around said central pipe as an axis, a plurality of supports disposed at spaced positions along said distributing pipe, a plurality of discharge nozzles spaced along said distributing pipe for spraying water onto the land as said distributing pipe moves around, and drive means at each support, the improvement which comprises the combination, at each intermediate support, of means responsive to the springing or bending of said distributing pipe at said intermediate support due to unequal movement at said intermediate support; means for controlling the speed of the drive means at said intermediate support; and means connecting said responsive means with said control means so as to reduce the speed of said drive means when such springing or bending takes place in one direction and to increase the speed of said drive means when such springing or bending takes place in the opposite direction.

9. In sprinkling and irrigation apparatus, the improvement defined in claim 8, including water actuated drive means at said supports; a water supply line to said drive means; and a regulating valve therefor as means for controlling the speed of drive means.

10. In sprinkling and irrigation apparatus, the improvement defined in claim 8, wherein said distributing pipe is relatively flexible.

11. In sprinkling and irrigation apparatus, the improvement defined in claim 8, wherein said distributing pipe is relatively rigid, and which includes flexible couplings at said supports.

12. In sprinkling and irrigation apparatus, the improvement defined in claim 8, wherein said distributing pipe is relatively rigid, and includes flexible couplings at said supports comprising sleeves of resilient material connecting the ends of sections of said distributing pipe.

13. In sprinkling and irrigation apparatus for a relatively large section of land or the like, which includes a central water supply pipe, a distributing pipe pivotally connected to said central supply pipe and movable around said central pipe as an axis, a plurality of supports disposed at spaced positions along said distributing pipe, a plurality of discharge nozzles spaced along said distributing pipe for spraying water onto the land as said distributing pipe moves around and drive means at each support, the improvement which comprises the combination, at an intermediate support, of a cable extending to and attached to said distributing pipe at each side of said intermediate support and thereby responsive to the springing or bending of said distributing pipe at said intermediate support due to unequal movement at said intermediate support; means for controlling the speed of the drive means at said intermediate support; and means connecting said cable with said control means so as to reduce the speed of said drive means when such springing or bending takes place in one direction and to increase the speed of said drive means when such springing or bending takes place in the opposite direction.

FRANK L. ZYBACH.

REFERENCES CITED

The following references are of record in the file of this patent:

UNITED STATES PATENTS

| Number | Name | Date |
|---|---|---|
| 1,085,609 | Heath | Feb. 3, 1914 |
| 1,150,144 | Norton | Aug. 17, 1915 |
| 1,197,534 | Norton | Sept. 5, 1916 |
| 1,255,777 | Norton | Feb. 5, 1918 |
| 1,966,783 | Balaam | July 17, 1934 |
| 2,057,217 | Soper | Oct. 13, 1936 |